United States Patent [19]
Dill

[11] 3,983,060
[45] Sept. 28, 1976

[54] LOW TEMPERATURE GLAZING COMPOSITION
[75] Inventor: Douglas W. Dill, Racine, Wis.
[73] Assignee: S. C. Johnson & Son, Inc., Racine, Wis.
[22] Filed: July 24, 1974
[21] Appl. No.: 491,589

[52] U.S. Cl............... 260/29.6 RW; 260/29.6 R; 260/29.6 RB; 427/385 R; 427/407 R
[51] Int. Cl.$^2$........................................ C08L 33/12
[58] Field of Search............... 260/29.6 R, 29.6 RB, 260/29.6 RW

[56] References Cited
UNITED STATES PATENTS

| | | | |
|---|---|---|---|
| 3,421,277 | 1/1969 | Frischmuth | 260/29.6 R |
| 3,706,696 | 12/1972 | Bernett | 260/29.6 R |
| 3,854,267 | 12/1974 | Weiant | 260/29.6 R |

Primary Examiner—Paul R. Michl

[57] ABSTRACT

A low temperature glazing composition consisting essentially of a mixture of 25–75% by weight of an aqueous dispersion of an acrylic resin having a monomer composition of 40–85% by weight methyl methacrylate, 45–15% by weight butyl acrylate and 0–15% by weight methacrylic acid, this dispersion having 15–25% non-volatiles and a pH of 8.5–10.5; and 75–25% by weight of a powdered resin composition having a particle size within the range of 100–400 mesh consisting essentially of 100–80% by weight of a resin having a monomer composition of 60–85% by weight methyl methacrylate and 40–15% by weight butyl acrylate having a molecular weight of 10,000–20,000 and a Tg greater than 45°C and 0–20% by weight of a pigment.

6 Claims, No Drawings

LOW TEMPERATURE GLAZING COMPOSITION

This present invention relates to a low temperature glazing composition for use in conjunction with home-type arts and crafts materials. More particularly, the present invention relates to a ceramic-like glazing composition which forms a glazed finish on ceramic or similar articles at low temperatures, such as are obtainable in a home oven.

During recent years home arts and crafts have received a great impetus; however, ceramic work as a home hobby has suffered due to the expense required in obtaining and utilizing a kiln suitable for firing and glazing ceramic articles.

Recently there has been developed a clay composition which has the attributes and working properties of normal clay but which contains a special binder so as to be baked and fired in a conventional household oven at relatively low temperatures. This composition is disclosed in my U.S. Pat. No. 3,817,897.

However, the advantage obtained by having a clay composition which can be fired and finished in an oven is lost if no suitable method for imparting a ceramic-like glaze to the finished products at similar temperatures is available. It is known to merely paint these products; however, the result achieved is not particularly satisfactory. Accordingly, the glaze compositions of the present invention were developed so as to form ceramic-like fired glazes on both oven-fired and kiln-fired clay products at household oven temperatures in the range of less than 400°F.

The composition of the present invention comprises 25–75% by weight of an aqueous acrylic resin dispersion and 75–25% by weight of an acrylic resin powder preferably containing a small percentage by weight of an organic or inorganic pigment. Also, since some of the glazes of the present invention do not impart kiln magic to the final product, it is a further embodiment of the present invention to utilize an aqueous emulsion polymer in the oven-baked glazing composition which have a sufficiently high minimum film-forming temperature so that the resulting film, when baked in an oven, becomes discontinuous thereby imparting interesting and varied effects to the finished ceramic article.

It is, therefore, the primary object of the present invention to provide a ceramic glazing composition suitable for home use.

It is a further object of the present invention to provide a ceramic glazing composition which forms a hard, glazed finish at temperatures attainable in a home oven.

It is a further object of the present invention to provide a ceramic glazing compound which, when baked in a home oven, produces a certain degree of film discontinuities to produce varied and interesting effects on the final product.

It is a still further object of the present invention to provide a method for decorating ceramic articles at relatively low temperatures.

Still further objects and advantages of the composition of the present invention will become more apparent from the following more detailed description thereof.

The present invention relates to a low temperature ceramic glazing composition consisting essentially of a mixture of 25–75% by weight of an aqueous dispersion of an acrylic resin having a monomer composition of 40–85% by weight methyl methacrylate, 45–15% by weight butyl acrylate and 15–0% by weight methacrylic acid, said dispersion having 15–25% by weight non-volatiles and a pH within the range of 8.5–10.5; and 75–25% by weight of a powdered resin composition having a particle size of between 100–400 mesh consisting essentially of 100–80% by weight of a resin having monomer composition of 60–85% by weight methyl methacrylate and 40–15% by weight butyl acrylate having a molecular weight of 10,000–20,000 and a Tg greater than 45°C and 0–20% by weight of a pigment.

The method of the present application comprises applying to a ceramic-like article at least one coating of a composition consisting essentially of an aqueous dispersion of a priming acrylic resin having 15–25% non-volatiles, the resin having a monomer composition of 40–85% by weight of methyl methacrylate, 45–15% by weight butyl acrylate and 0–15% by weight methacrylic acid at a pH of 8.5–10.5, mixed with 0–10% by weight pigment; optionally baking the glazed article at 250°–400°F for from 5 to 60 minutes; applying at least one coating of a mixture of aqueous dispersion and powdered resin to the primed ceramic article and baking the article to a temperature within the range of 250°–400°F for from 30 minutes to 4 hours.

As used in the present invention, the term ceramic means either a true high fired ceramic article, a ceramic-like article such as disclosed in U.S. Pat. No. 3,817,897, glass or metals.

The glazing composition of the present invention comprises two parts, the first part is a glazing liquid; and the second part is a resin powder preferably containing pigment.

The glazing liquid is essentially an aqueous dispersion of an acrylic resin in either solution or emulsion form. This acrylic resin has a monomer composition of 40–85% by weight methyl methacrylate, 45–15% by weight butyl acrylate and 15–0% by weight methacrylic acid. the resin is a low molecular weight polymer and has a weight average molecular weight in the range of 5,000–30,000. This resin dispersion contains 15–25% by weight non-volatiles and has a pH of 8.5–10.5.

The MFT (minimum film-forming temperature, which is an indication of the temperature at which the particular resin solution or emulsion will form a continuous film, is not critical and, if properly used, high and low MFT materials will produce continuous films. In general, at temperatures above the MFT, a particular resin film will be continuous, while, at temperatures below the MFT, this film will become discontinuous and form internal stresses which create crazing and cracking of the resultant film.

If the resin dispersion is a film-former at room temperature, i.e., it must have an MFT of less than 35°C, no particular pretreatment of the ceramic surface is necessary, except for a prime coat. However, if a resin dispersion having an MFT greater than 35°C is used, the surface must be primed with the same dispersion and baked for a short time. Further coatings of the disprsion over itself will produce a high gloss continuous film.

By using resin solutions having from 15–25% non-volatiles at the pH of from 8.5–10.5, the particular monomer composition of the glazing vehicle of the present invention produces good flow characteristics at elevated temperature so as to produce a glazed film having a relatively uniform thickness. Two preferred polymers for producng a continuous glazed film comprise a solution polymer of 52% methyl methacrylate, 38% butyl acrylate and 10% methacrylic acid and an emulsion polymer of 84% methyl methacrylate and 16% butyl acrylate.

The resin powder portion of the composition of the present invention comprises 100–80% of a resin and 0–20% of a pigment and preferably 96–80% resin and 4–20% pigment. The resin powder which comprises 25–75% by weight of the entire composition has a particle size within the range of 100–400 mesh and it is particularly preferred that the particle size is about 200 mesh. This powdered pigment consists essentially of 100–80% and preferably 96–80% by weight of a resin having a monomer composition of 60–85% by weight methyl methacrylate and 40–15% by weight butyl acrylate and has a molecular weight in the range of 10,000–20,000 and a Tg greater than 45°c. The preferred resin has a monomer content of 84% methyl methacrylate and 16% butyl acrylate. The pigment, which can be any conventional colored inorganic or organic material, is present in the range of 0–20% and preferably 4–20% by weight. If it is desired, a colorless coating can be formed by using no pigment; however, if color is desired, at least 4% by weight should be used.

If a colored coating or glaze is desired, any conventional organic or inorganic pigment or dye which is color fast and stable at temperatures of 250°–400°F can be used. When used in this specification and claims, pigment means both pigments and dyes. Suitable inorganic pigments include red iron oxide, yellow iron oxide, i.e., hydrated $Fe_2O_3$, carbon black, titanium dioxide, chromium oxide, etc. Suitable organic pigments include phthalocyanine blue, hansa yellow toner, naphthol red, toludine red, phthalocyanine green, ultramarine blue, diarylide yellow, etc. also some suitable dyes include FD&C yellow No. 5, FD&C yellow No. 6, FD&C red No. 2, FD&C red No. 4, etc.

The mixture of resin powder and pigment is formed by mixing a small amount of pigment, preferably in an aqueous dispersion, with a large percentage of polymer in an aqueous dispersion. This mixture is then formed into a powder by any conventional method, such as spray drying or air drying followed by grinding into a fine powder.

The composition of the present invention is applied to ceramic articles by first applying a coating of the resin dispersion alone, or mixed with a small amount of pigment, as a prime coat. This aids in reducing the air holes which may form during baking. If the prime coat has an MFT of greater than 35°C, the article must be pre-baked at from 250°–400°F for 5 to 60 minutes. Then an aqueous dispersion of a resin, either the same as the priming resin or different, is mixed in the proper ratio, i.e., from 3:1 to 1:3, liquid to powder with a powdered resin which preferably will contain a pigment and applied to the ceramic article by any conventional means. The MFT of the prime coat and the aqueous dispersion used to mix with the powdered resin should have a similar MFT, i.e., if the MFT of the prime coat is above 35°C, the MFT of the aqueous dispersion also should be above 35°C, although if a prime coat having an MFT above 35°C is used an aqueous dispersion with a lower MFT can be used to coat and decorate the article. Although one coating may be sufficient, it is often desirable to apply two or more coats of the mix of powdered resin and aqueous resin dispersion before baking to insure an even coating or glaze. This coated article is placed in a conventional home oven at a temperature in the range of 275°–450°F for 30 minutes to 4 hours. The preferred baking conditions are a temperature of 300°F for 2 hours.

A surprising feature of the glazing compositions of the present invention is the unusual effects which can be achieved by varying the type of coating. As noted above, the MFT of the aqueous dispersion is not critical as long as these compositions with a high MFT, i.e., non-film formers, are not coated over a previous composition having a low MFT. It has been found that, although these high MFT coatings form superior continuous films when applied to a properly primed surface, surprising and highly decorative results are obtained when the high MFT resin, i.e., above 35°C, is applied directly over a previously coated and baked surface of low MFT coating or over a high MFT coating which has been further primed with a coating of a low MFT dispersion.

By varying the number of coatings of continuous glazing material and discontinuous glazing material, a variety of differing effects can be produced.

The coating compositions and methods of the present invention are unique in that they permit a very high solids level of coating to be placed on the article to be coated. The mixture of the resin dispersion and resin powder can have a combined solids content of 40–60% which adheres to the article before baking and which flows to form a relatively thick continuous or discontinuous film.

The composition and method of the present invention will now be illustrated by the following examples which are for the purposes of illustration and wherein all parts and percentages are by weight and all temperatures are in degrees Farenheit.

EXAMPLE 1

The aqueous dispersion resin used as the liquid vehicle is prepared by charging 49 lbs. of organic solvent, such as toluene, to a reactor and heating to 203°F. Some ½ lbs. of t-butyl peroctoate initiator is then added, followed by the following monomer mixture added at a constant rate for 60 minutes:

| | |
|---|---|
| Methyl methacrylate | 25.5 lbs. |
| Butyl acrylate | 18.6 lbs. |
| Acrylic acid | 4.9 lbs. |
| t-Butyl peroctoate | 1.3 lbs. |

After the monomer mixture has been added, a further 0.2 lbs. of t-butyl peroctoate is added, and the reaction mixture is held at 203°F for 2 hours. This mixture is allowed to cool and the solvent is evaporated in a wiped film evaporator at a temperature in the range of 380°F–420°F. An ammonia cut is prepared by adding 8.4 grams of 28% $NH_4OH$ to 393 grams of heated (140°F) deionized water. 100 grams of dried resin is added to this mix with minimal agitation followed by heating for about 30–60 minutes until the cut is formed. This material is useful as the priming compound and as the liquid vehicle for the powdered pigment in the glaze.

A red powdered pigment-resin mix is prepared by spray drying 96% of a 30% non-volatile aqueous emulsion of 75% methyl methacrylate and 25% butyl acrylate (Tg=79°C, Mw=14,700) prepared using conventional emulsion polymerizing action techniques with 2.5% red iron oxide pigment, 0.75% deionized water and 0.75% aqueous ammonia at a temperature of 150°F. an approximately 1 to 1 mixture of the above powder with the above resin cut was made and two coats were applied to a ceramic article which had been previously been coated with the resin cut as a primer. This article was then baked at 300°F for 2 hours and produced an even red glazed surface.

EXAMPLE 2

An emulsion having 75% methyl methacrylate and 25% butyl acrylate was prepared and mixed with a white powdered titanium dioxide pigment prepared as in Example 1 in a 1 to 1 ratio. One coat of this mix was applied to the glazed article of Example 1 and allowed to dry for 2 hours until fine cracks appeared in the white coating. The article was again baked at 300°F for 2 hours and produced a finished article having a decorative red and white appearance.

The foregoing examples are for the purposes of illustration only and the composition of the present invention should not be construed as limited thereto, this composition being fully described in the appended claims.

What is claimed is:

1. A low temperature ceramic glazing composition consisting essentially of 25–75% by weight of an aqueous dispersion of a first acrylic resin having a monomer composition of 40–85% by weight methyl methacrylate, 45–15% by weight butyl acrylate and 0–15% by weight methacrylic acid, said dispersion having 15–25% non-volatiles and a pH of 8.5–10.5, and 75–25% by weight of a powdered resin composition having a particle size of about 100 to about 400 mesh consisting essentially of 96–80% by weight of a second acrylic resin having a monomer composition of 60–85% by weight methyl methacrylate and 40–15% by weight butyl acrylate having a weight average molecular weight of 10,000–20,000 and a Tg of greater than 45°C and 4–20% by weight of a pigment.

2. The composition of claim 1 wherein said dispersion is an ammonia cut of a solution polymer of 52% methyl methacrylate, 38% butyl acrylate and 10% methacrylic acid.

3. The composition of claim 1 wherein said second acrylic resin comprises 84% methyl methacrylate and 16% butyl acrylate.

4. The composition of claim 2 wherein said second acrylic resin comprises 84% methyl methacrylate and 16% butyl acrylate.

5. The composition of claim 1 wherein said first acrylic resin has a weight average molecular weight of 5000–30,000.

6. The composition of claim 1 wherein said powder resin composition has a particle size of about 200 mesh.

* * * * *